(12) United States Patent
Su et al.

(10) Patent No.: US 8,305,539 B2
(45) Date of Patent: Nov. 6, 2012

(54) LIQUID CRYSTAL DISPLAY ELEMENT AND PIXEL STRUCTURE

(75) Inventors: Ting-Wei Su, Hsin-Chu (TW); Pei-Chun Liao, Hsin-Chu (TW); Hung-Lung Hou, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 137 days.

(21) Appl. No.: 12/213,252

(22) Filed: Jun. 17, 2008

(65) Prior Publication Data

US 2009/0135321 A1 May 28, 2009

(30) Foreign Application Priority Data

Nov. 28, 2007 (TW) ................................ 96145132 A (51) Int. Cl.
*G02F 1/1343* (2006.01)
*G02F 1/136* (2006.01)
(52) U.S. Cl. .......................................... 349/144; 349/48
(58) Field of Classification Search .................. 349/144, 349/48, 37, 143, 84, 139, 129, 54, 73, 74
See application file for complete search history.

(56) References Cited

U.S. PATENT DOCUMENTS

| | | | |
|---|---|---|---|
| 6,429,907 B1 * | 8/2002 | Park et al. ..................... 349/38 |
| 6,781,658 B1 * | 8/2004 | Choi ............................. 349/139 |
| 7,535,532 B2 | 5/2009 | Hsu et al. | |
| 7,898,626 B2 | 3/2011 | Hsu et al. | |
| 2004/0080679 A1 * | 4/2004 | Song et al. ..................... 349/43 |
| 2006/0176434 A1 * | 8/2006 | Kim et al. ..................... 349/145 |
| 2006/0197882 A1 | 9/2006 | Oh et al. | |
| 2007/0030233 A1 | 2/2007 | Chai et al. | |
| 2007/0103631 A1 | 5/2007 | Moon et al. | |
| 2007/0109482 A1 * | 5/2007 | Kim .............................. 349/144 |
| 2007/0268435 A1 | 11/2007 | Kuo et al. | |

FOREIGN PATENT DOCUMENTS

TW I26 1712 B 9/2006
TW M 303 386 U 12/2006

OTHER PUBLICATIONS

Office Action issued on Dec. 29, 2011 in corresponding Taiwan application No. 096145132.

* cited by examiner

*Primary Examiner* — Mark Robinson
*Assistant Examiner* — Robert Tavlykaev
(74) *Attorney, Agent, or Firm* — Bacon & Thomas, PLLC (57) ABSTRACT

A pixel structure of liquid crystal display including a first and a second sub-pixel electrodes, a first and a second data lines, a gate line, and a first and a second transistors is provided. The first and the second sub-pixel electrodes disposed in the first and second sub-pixel areas respectively include at least two display domains at left and right. The first data line is disposed under the interface between two domains of each of the first and second sub-pixel electrodes, and the second data line is disposed under the edges of the first and second sub-pixel electrodes. The gate line is disposed between the first and second sub-pixel areas. The first sub-pixel electrode is controlled by the gate line and the first data line through the first transistor. The second sub-pixel electrode is controlled by the gate line and the second data line through the second transistor.

14 Claims, 4 Drawing Sheets

LIQUID CRYSTAL DISPLAY ELEMENT AND PIXEL STRUCTURE

This application claims the benefit of Taiwan application Serial No. 96145132, filed Nov. 28, 2007, the subject matter of which is incorporated herein by reference.

BACKGROUND OF THE INVENTION

1. Field of the Invention

The invention relates in general to a pixel structure of liquid crystal display element, and more particularly to a pixel structure of a liquid crystal display element capable of reducing vertical crosstalk effect and having high transmittance.

2. Description of the Related Art

Along with the rapid growth in the demand for portable products such as personal digital assistant (PDA), cellular phone, projector and large-sized projection TV, the demand for liquid crystal display (LCD) also grows, and consumers are requesting perfect display quality of the portable products. And how to improve product yield rate and make the quality meet consumers' request has become an essential factor in the design of display elements to manufacturers of LCD elements.

Figure 1:
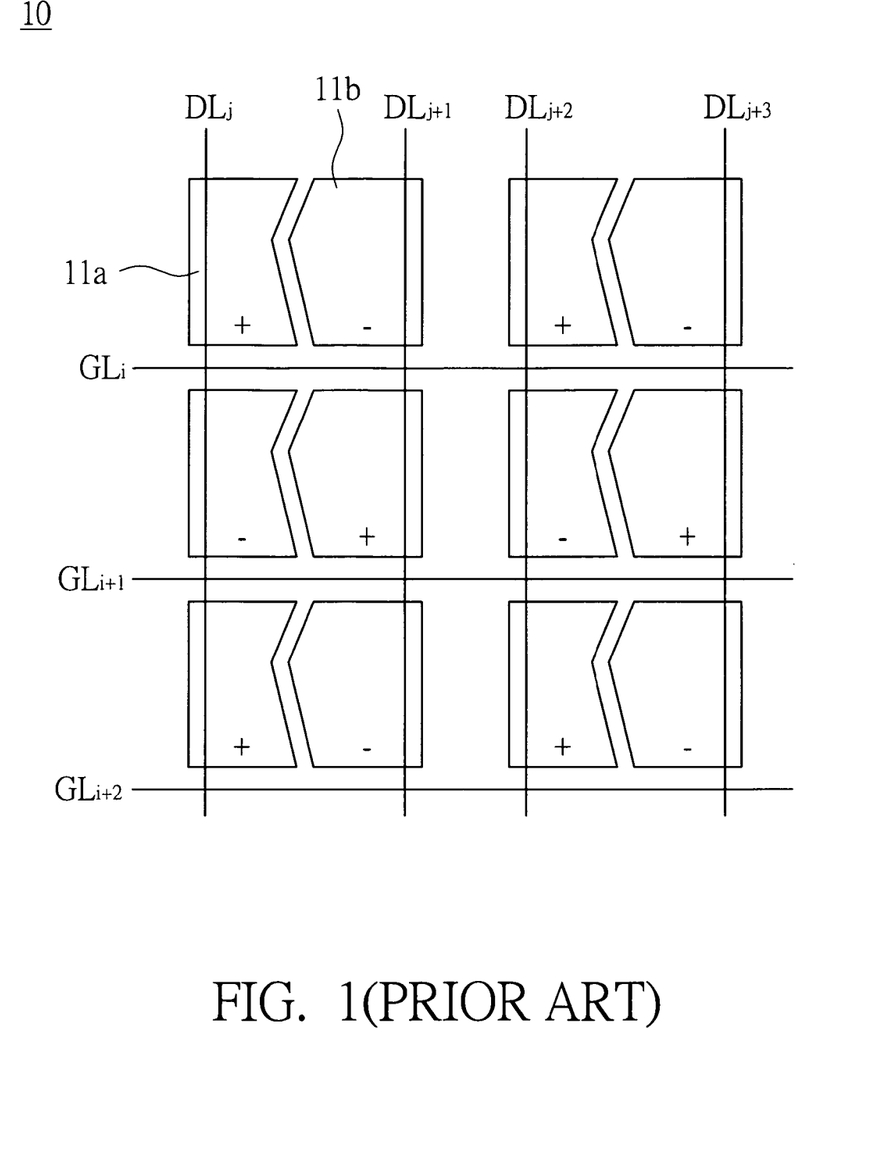
FIG. 1 is a diagram of a conventional pixel design of liquid crystal display element.

FIG. 1 is a diagram of a conventional pixel design of liquid crystal display element. In the design of the pixel of liquid crystal display element of FIG. 1, the data lines originally disposed at two sides of the pixel region are shifted to be at the inner side of each pixel region and under the transparent electrode (ITO). That is, the data lines are disposed within the transmitting area so as to achieve the effect of dot conversion.

Referring to FIG. 1. The liquid crystal display element 10 includes a plurality of gate lines $GL_i$, $GL_{i+1}$, $GL_{i+2}$ ... and data lines $DL_j$, $DL_{j+1}$, $DL_{j+2}$, $DL_{j+3}$ ..., wherein i is a positive integer, j is a positive integer, the gate lines and the data lines are substantially criss-crossed in a matrix to define a plurality of pixel areas, and each pixel area includes a left sub-pixel area 11a and a right sub-pixel area 11b. The data lines are respectively disposed at the inner side of the left sub-pixel area 11a and the right sub-pixel area 11b of each pixel area and positioned under the transparent electrode (ITO). When the pixel areas of the liquid crystal display element 10 are driven, if the polarity of respective data voltage inputted to the data lines $DL_j$, $DL_{j+1}$, $DL_{j+2}$, $DL_{j+3}$ ... (j is a positive integer) is in the sequence of +, −, +, −, +, −, ..., then voltages of opposite polarities are inputted to the left sub-pixel area 11a and the right sub-pixel area 11b in each pixel area.

However, there are many defects in the design of pixels as indicated in FIG. 1. When the data lines $DL_j$, $DL_{j+1}$ provide a signal to the pixel area disposed between the data lines $DL_j$ and $DL_{j+1}$ and above the gate line $GL_i$, the adjacent pixel area next to it is not driven. Due to the capacitance coupling effect between the data lines and the transparent electrode, the pixel area that is not driven originally will be affected by the driving of neighboring pixel area and result in the problem of vertical crosstalk. Moreover, the design of disposing the data lines within the transmitting area will affect the aperture rate and decrease the transmittance.

Therefore, how to manufacture a high quality liquid crystal display element capable of reducing vertical crosstalk, maintaining pixel transmittance, preventing the display element from short-circuiting (for example, the metal lines will be short-circuited if the data lines are too close in the manufacturing process), and improving the yield rate of manufacturing process has become a focus of considerations in the research and development.

SUMMARY OF THE INVENTION

The invention is directed to a liquid crystal display element capable of reducing vertical crosstalk of pixels and maintaining pixel transmittance and symmetry of view angle so that the manufactured element has high quality, the manufacturing process is free of metal line short-circuiting and has high yield rate due to the pixel design.

According to a first aspect of the present invention, a liquid crystal display element including a plurality of gate lines and data lines is provided. The gate lines and the data lines are substantially criss-crossed in a matrix to define a plurality of pixel areas, and each pixel area includes a first sub-pixel area and a second sub-pixel area.

The liquid crystal display element includes a first sub-pixel electrode and a second sub-pixel electrode, wherein each of the first sub-pixel electrode and the second sub-pixel electrode at least include two display domains at the left and the right.

The first data line is disposed at the interface between the two display domains of the first sub-pixel electrode and the second sub-pixel electrode, and the second data line is disposed at the edges of the pixel area.

The gate line is disposed between the second sub-pixel area and the first sub-pixel area. The liquid crystal display element includes a first transistor and a second transistor, wherein the first sub-pixel electrode and the second sub-pixel electrode are respectively controlled by the first data line and the second data line through the first transistor and the second transistor.

According to a second aspect of the present invention, a liquid crystal display element including at least two pixel areas is provided. The pixel areas is defined by a plurality of the gate lines and the data lines which are substantially criss-crossed in a matrix. Two pixel elements including a first pixel element and a second pixel element are respectively disposed in a first pixel area and a second pixel area, wherein the first pixel area includes a first sub-pixel area and a second sub-pixel area, and the second pixel area includes a third sub-pixel area and a fourth sub-pixel area.

The first pixel area includes a first sub-pixel area and a second sub-pixel area, and a first data line, a second data line and a gate line are disposed adjacently.

The first pixel element includes a first sub-pixel electrode and a second sub-pixel electrode respectively disposed in the first sub-pixel area and the second sub-pixel, wherein each of the first sub-pixel electrode and the second sub-pixel electrode at least includes two display domains at the left and the right.

The first data line is disposed at the interface between the two display domains of the first sub-pixel electrode and the second sub-pixel electrode, and the second data line is disposed at the edges of the first pixel area.

The gate line is disposed between the second sub-pixel electrode and the first sub-pixel electrode, and the first pixel element includes a first transistor and a second transistor, wherein the first sub-pixel electrode and the second sub-pixel electrode are respectively controlled by the first data line and the second data line through the first transistor and the second transistor.

The second pixel area includes a third sub-pixel area and a fourth sub-pixel area, and a third data line, a fourth data line and the gate line are disposed adjacently.

The second pixel element includes a third sub-pixel electrode and a fourth sub-pixel electrode respectively disposed in the third sub-pixel electrode and the fourth sub-pixel electrode, wherein each of the third sub-pixel electrode and the fourth sub-pixel electrode includes two display domains at the left and the right.

The third data line is disposed at the interface between the two display domains of the third sub-pixel electrode and the fourth sub-pixel electrode, and the fourth data line is disposed at the edges of the second pixel area.

The gate line is disposed between the third sub-pixel electrode and the fourth sub-pixel electrode, and the second pixel element includes a third transistor and a fourth transistor, wherein the fourth sub-pixel electrode and the third sub-pixel electrode are respectively controlled by the third data line and the fourth data line through the third transistor and the fourth transistor.

According to a third aspect of the present invention, a pixel structure of liquid crystal display including a first sub-pixel electrode and a second sub-pixel electrode, a first data line and a second data line, a gate line, and a first transistor and a second transistor is provided.

The first sub-pixel electrode and the second sub-pixel electrode are respectively disposed in a first sub-pixel area and a second sub-pixel area neighboring the first sub-pixel area, wherein each of the first sub-pixel electrode and the second sub-pixel electrode respectively includes two display domains at the left and the right.

The first data line is disposed under the interface between two display domains of the first sub-pixel electrode and the second sub-pixel electrode, and the second data line is disposed under the edges of the first sub-pixel electrode and the second sub-pixel electrode.

The gate line is disposed between the second sub-pixel area and the first sub-pixel area.

The first sub-pixel electrode is controlled by the gate line and the first data line through the first transistor, and the second sub-pixel electrode is controlled by the gate line and the second data line through the second transistor.

The invention will become apparent from the following detailed description of the preferred but non-limiting embodiments. The following description is made with reference to the accompanying drawings.

DETAILED DESCRIPTION OF THE INVENTION

The invention provides a pixel structure of liquid crystal display element capable of reducing vertical crosstalk effect. A single pixel area is divided into two sub-pixel areas at the top and the bottom, and each of the two sub-pixel areas includes two display domains at the left and the right. The data line is disposed at the interface between the left display domain and the right display domain and positioned under the transparent electrode (ITO).

According to an embodiment of the invention, a single pixel area is divided into at least a first sub-pixel area and a second sub-pixel area. The display element includes a first sub-pixel electrode and a second sub-pixel electrode respectively disposed in the first sub-pixel area and the second sub-pixel area, and each of the first sub-pixel electrode and the second sub-pixel electrode includes two display domains at the left and the right. The liquid crystal molecules in the display domain tilt in different directions and degrees (that is, a single pixel area at least includes four liquid crystal display domains with different tilting directions). In each pixel area, the first data line is disposed at the interface between two display domains of the first sub-pixel electrode and the second sub-pixel electrode, and the second data line is disposed at the edges of the pixel area. The gate line substantially criss-crossed with the first and the second data lines is disposed between the first sub-pixel area and the second sub-pixel area. The display element includes a first transistor and a second transistor. The first sub-pixel electrode and the second sub-pixel electrode are respectively controlled by the first data line and the second data line through the first transistor and the second transistor.

The invention is exemplified by a first embodiment and a second embodiment. In the two embodiments, each single pixel area includes eight display domains whose liquid crystal molecules are tilting at different directions. The first embodiment discloses the structure of a single pixel area, and the second embodiment discloses a pixel driving method of the invention. However, the embodiments disclosed herein are used for illustrating the present invention, but not for limiting the scope of the present invention. Besides, the drawings used for illustrating the embodiment and applications of the present invention only show the characteristic parts to avoid obscuring the invention.

First Embodiment

Figure 2:
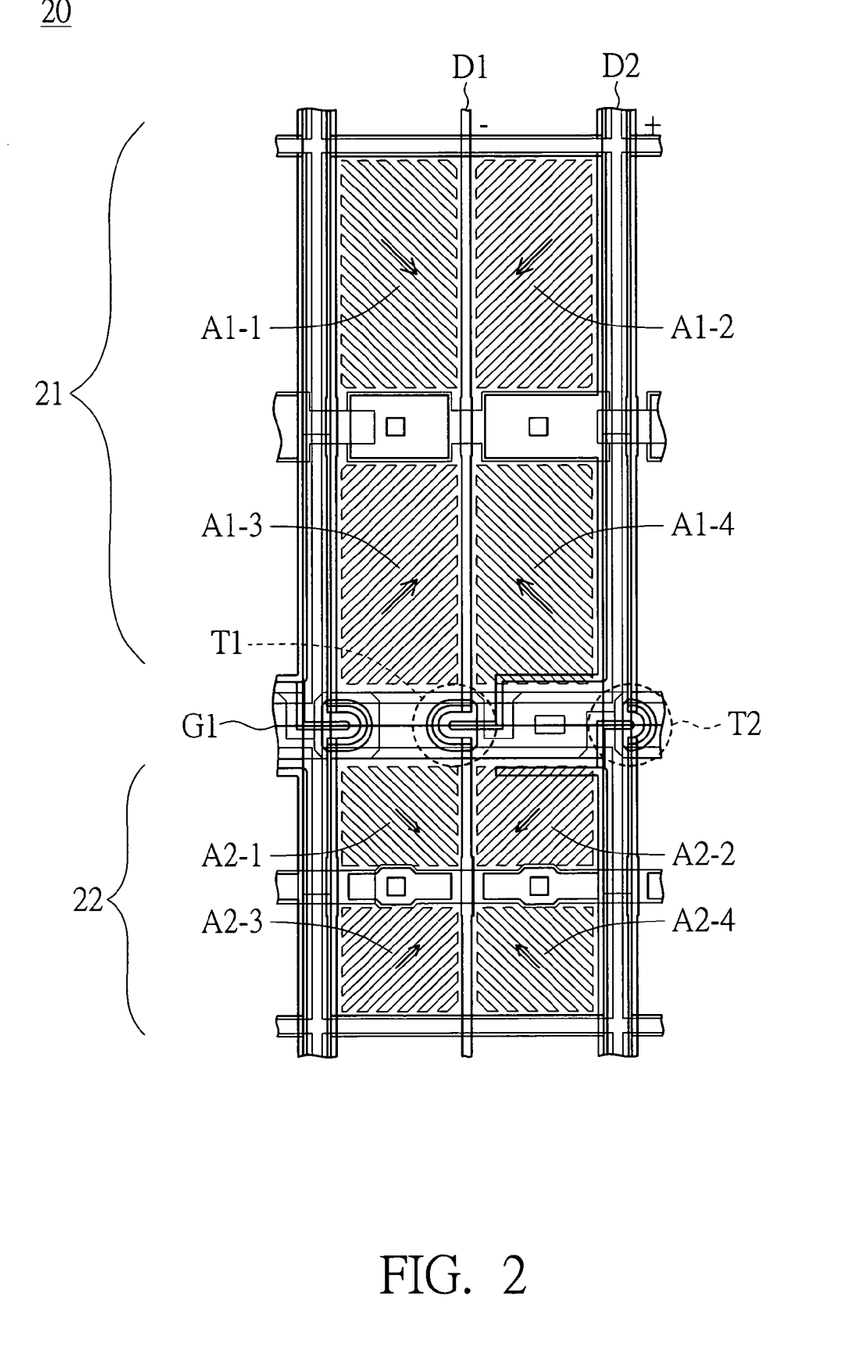
FIG. 2 is a structural diagram of a single pixel area according to a first embodiment of the present invention.

FIG. 2 is a structural diagram of a single pixel area according to a first embodiment of the present invention. As indicated in FIG. 2, the liquid crystal display element 20 includes a first data line $D_1$, a second data line $D_2$ and a gate line $G_1$ substantially crisscrossed with the first data line $D_1$ and the second data line $D_2$. Each pixel area includes a first sub-pixel area 21 and a second sub-pixel area 22 neighboring the first sub-pixel area 21, wherein the first sub-pixel electrode and the second sub-pixel electrode are respectively disposed in the first sub-pixel area 21 and the second sub-pixel area 22. The first sub-pixel electrode in the first sub-pixel area 21 and the second sub-pixel electrode in the second sub-pixel area 22 respectively correspond to four display domains. In the present embodiment of the invention, the area of the first sub-pixel area 21 is larger than that of the second sub-pixel area 22.

The first data line $D_1$ is disposed at the interface between the left and the right display domains of the first sub-pixel electrode and the second sub-pixel electrode, and the second data line $D_2$ is disposed under the edges of the first sub-pixel electrode and the second sub-pixel electrode.

The gate line $G_1$ disposed between the second sub-pixel area 22 and the first sub-pixel area 21. A first transistor T1 and a second transistor T2, wherein the first sub-pixel electrode and the second sub-pixel electrode are respectively controlled by the first data line $D_1$ and the second data line $D_2$ through the first transistor T1 and the second transistor T2.

Referring to FIG. 2. In the first sub-pixel area 21, the first display domain A1-1 and the third display domain A1-3 of the first sub-pixel electrode are disposed at the left of the first data line $D_1$, the second display domain A1-2 and the fourth display domain A1-4 are disposed at the right of the first data line $D_1$. The first data line $D_1$ is disposed at the interface between the first display domain A1-1 and the second display domain A1-2 and also disposed at the interface between the third display domain A1-3 and the fourth display domain A1-4.

Likewise, in the second sub-pixel area 22, the first display domain A2-1 and the third display domain A2-3 of the first sub-pixel electrode are disposed at the left of the first data line $D_1$, the second display domain A2-2 and the fourth display domain A2-4 are disposed at the right of the first data line $D_1$. The first data line $D_1$ is disposed at the interface between the first display domain A2-1 and the second display domain A2-2 and also disposed at the interface between the third display domain A2-3 and the fourth display domain A2-4.

Moreover, the first sub-pixel electrode and the second sub-pixel electrode correspondingly control the tilting directions of the liquid crystal molecules in the eight display domains which form a contained angle with the first data line $D_1$. For example, a contained angle of 45 degrees is formed.

When a single pixel electrode of FIG. 2 is driven, the first display domain A1-1, the second display domain A1-2, the third display domain A1-3, and the fourth display domain A14 of the first sub-pixel electrode are controlled by the first data line $D_1$ through the first transistor T1, and the first display domain A2-1, the second display domain A2-2, the third display domain A2-3, the fourth display domain A24 of the second sub-pixel electrode are controlled by the second data line $D_2$ through the second transistor T2.

When the display element is driven, the first sub-pixel electrode and the second sub-pixel electrode of the single pixel area could be driven by the first voltage and the second voltage of opposite polarities (such as the − polarity and the + polarity respectively), so that the four display domains in the first sub-pixel area 21 and the four display domains in the second sub-pixel area 22 would have opposite polarities. In practical application, the second voltage could be larger than the first voltage.

In the first embodiment of the invention, the first data line $D_1$ is disposed at the center of the transmitting area of the pixel. As such location having poor transmittance is exactly the interface between the display domains, the overall transmittance of the pixel and the symmetry of the display domain will not be significantly affected. Moreover, the second data line $D_2$ is disposed at the edge of the transmitting area of a neighboring pixel, so the overall transmittance and the symmetry of the display domain of the neighboring pixel either will not be significantly affected.

In practical application, when the panel is displaying uniformed signals, the first data line $D_1$ and the second data line $D_2$ covered by the pixel electrodes can carry signals of opposite polarities but with the same amplitude, so the capacitance coupling between the first data line $D_1$ and the second data line $D_2$ and the pixel electrode will be offset, hence avoiding vertical crosstalk. Moreover, in the design of the pixel structure, there is still a certain distance between the first data line $D_1$ and the second data line $D_2$, hence avoiding neighboring data lines being short-circuited.

Second Embodiment

In the second embodiment, it is exemplified by taking two neighboring pixel areas as a unit for constructing a display element. To drive the display element can be viewed as to operate pixel elements in these pixel areas. The structure and the operation of a pixel element are illustrated in details as below. Noted that the second embodiment is for illustrating one of the methods of driving the pixel elements of the invention not for limiting the scope of protection of the invention.

Figure 3:
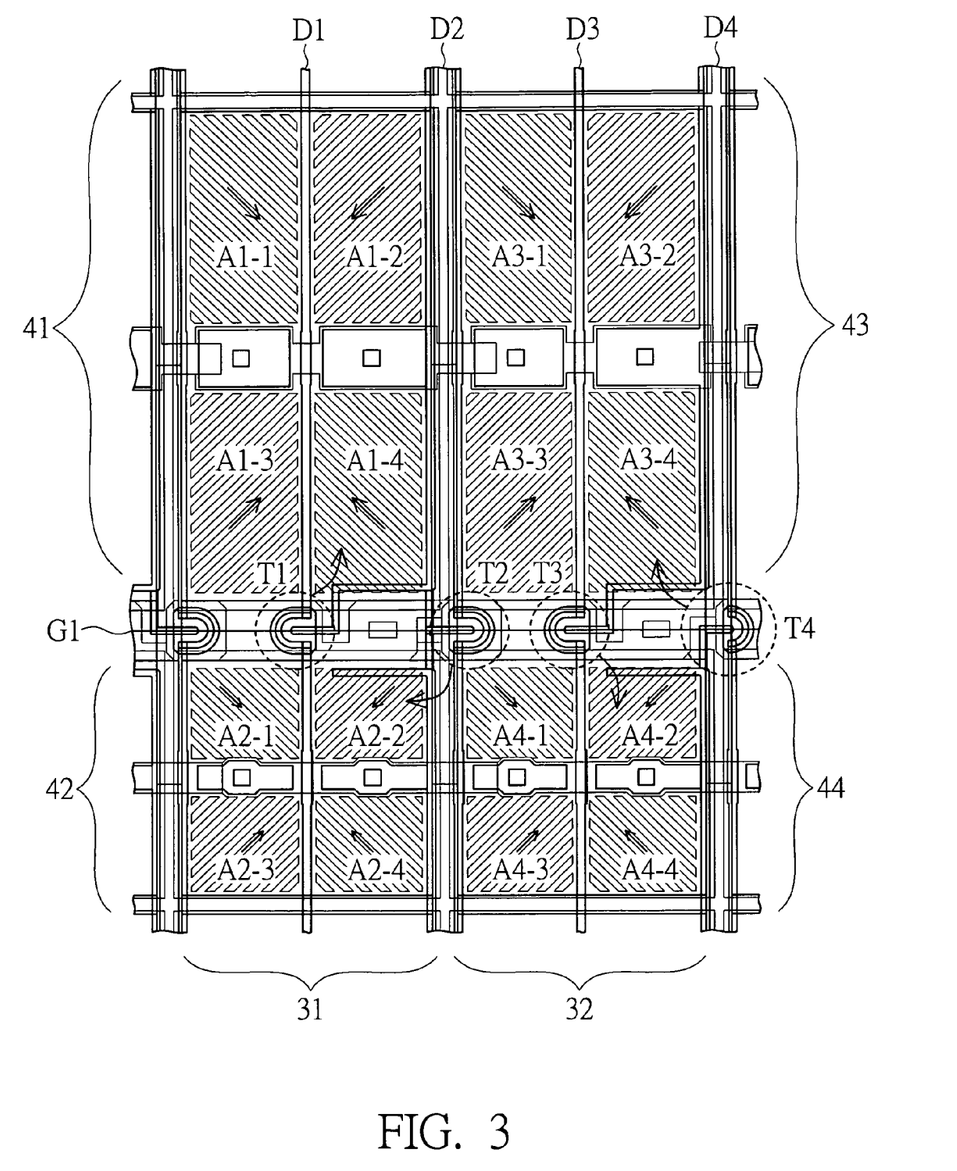
FIG. 3 is a structural diagram of two pixel areas according to a second embodiment of the present invention.

FIG. 3 is a structural diagram of two pixel areas according to a second embodiment of the present invention. The pixel elements are disposed in two neighboring pixel areas. As indicated in FIG. 3, a first pixel element and a second pixel element of the liquid crystal display element 30 are respectively disposed in a first pixel area 31 and a second pixel area 32, wherein the first pixel area 31 includes a first sub-pixel area 41 and a second sub-pixel area 42, and the second pixel area 32 includes a third sub-pixel area 43 and a fourth sub-pixel area 44.

In practical application, the area of the first sub-pixel area 41 is larger than that of the second sub-pixel area 42, and the area of the third sub-pixel area 43 is larger than that of the fourth sub-pixel area 44. The area of the first sub-pixel area 41 of the first pixel area 31 is substantially equal to that of the third sub-pixel area 43 of the second pixel area 32, and the area of the second sub-pixel area 42 of the first pixel area 31 is substantially equal to that of the fourth sub-pixel area 44 of the second pixel area 32.

<The Structure of the First Pixel Area 31>

The first pixel area 31 includes a first sub-pixel area 41 and a second sub-pixel area 42, wherein the first pixel element includes a first sub-pixel electrode and a second sub-pixel electrode. The first sub-pixel electrode in the first sub-pixel area 41 and the second sub-pixel electrode in the second sub-pixel area 42 respectively correspond to four display domains. In the first pixel area 31, the first data line $D_1$ and the second data line $D_2$ are substantially crisscrossed with the gate line $G_1$. The first data line $D_1$ is disposed at the interface between the left and the right display domains of the first sub-pixel electrode and the second sub-pixel electrode, and the second data line $D_2$ is disposed at the edges of the first sub-pixel electrode and the second sub-pixel electrode.

The first sub-pixel area 41 of the first pixel area 31 has four display domains, including the first display domain A1-1 and the third display domain A1-3 both disposed at the left of the first data line $D_1$, and the second display domain A1-2 and the fourth display domain A1-4 both disposed at the right of the first data line $D_1$. The first data line $D_1$ is disposed at the interface between the first display domain A1-1 and the second display domain A1-2, and also disposed at the interface between the third display domain A1-3 and the fourth display domain A1-4.

Likewise, in the second sub-pixel area 42 of the first pixel area 31, the second sub-pixel electrode has four display domains including the first display domain A2-1 and the third display domain A2-3 both disposed at the left of the first data line $D_1$, and the second display domain A2-2 and the fourth display domain A2-4 both disposed at the right of the first data line $D_1$. The first data line $D_1$ is disposed at the interface between the first display domain A2-1 and the second display domain A2-2, and also at the interface between the third display domain A2-3 and the fourth display domain A2-4.

For the first pixel area 31, the gate line $G_1$ is disposed between the first sub-pixel area 41 and the second sub-pixel area 42, and the first pixel element includes a first transistor T1 and a second transistor T2. The four display domains of the first sub-pixel electrode and the four display domains of the second sub-pixel electrode are respectively controlled by the first data line $D_1$ and the second data line $D_2$ through the first transistor T1 and the second transistor T2.

Moreover, the tilting directions of the liquid crystal molecules in the eight display domains of the first sub-pixel electrode and the second sub-pixel electrode are correspondingly controlled to form a contained angle with the first data line $D_1$. Examples of the contained angles include about 45 degrees as shown in FIG. 3.

<The Structure of the Second Pixel Area 32>

The second pixel area 32 includes a third sub-pixel area 43 and a fourth sub-pixel area 44, wherein the second pixel element includes a third sub-pixel electrode and a fourth sub-pixel electrode. The third sub-pixel electrode in the third sub-pixel area 43 and the fourth sub-pixel electrode in the fourth sub-pixel area 44 respectively correspond to four display domains. In the second pixel area 32, the third data line $D_3$ and the fourth data line $D_4$ are substantially criss-crossed with the gate line $G_1$. The third data line $D_3$ is disposed at the interface between the left and the right display domains of the third sub-pixel electrode and the fourth sub-pixel electrode, and the fourth data line $D_4$ is disposed under the edges of the third sub-pixel electrode and the fourth sub-pixel electrode.

The third sub-pixel area 43 of the second pixel area 32 has four display domains including the first display domain A3-1 and the third display domain A3-3 both disposed at the left of the third data line $D_3$, and the second display domain A3-2 and the fourth display domain A34 both disposed at the right of the third data line $D_3$. The third data line $D_3$ is disposed at the interface between the first display domain A3-1 and the second display domain A3-2, and also at the interface between the third display domain A3-3 and the fourth display domain A3-4.

Likewise, in the fourth sub-pixel area 42 of the second pixel area 32, the second sub-pixel electrode has four display domains including the first display domain A4-1 and the third display domain A4-3 both disposed at the left of the third data line $D_3$, and the second display domain A4-2 and the fourth display domain A4-4 both disposed at the right of the third data line $D_3$. The third data line $D_3$ is disposed at the interface between the first display domain A4-1 and the second display domain A4-2, and also at the interface between the third display domain A4-3 and the fourth display domain A44.

For the second pixel area 32, the gate line $G_1$ is disposed between the third sub-pixel area 43 and the fourth sub-pixel area 44, and the second pixel element includes a third transistor T3 and a fourth transistor T4. The four display domains of the fourth sub-pixel electrode and the four display domains of third sub-pixel electrode are respectively controlled by the third data line $D_3$ and the fourth data line $D_4$ through the third transistor T3 and the fourth transistor T4.

Moreover, the tilting directions of the liquid crystal molecules in the eight display domains of the third sub-pixel electrode and the fourth sub-pixel electrode are correspondingly controlled to form a contained angle with the first data line $D_3$. Examples of the contained angles include 45 degrees as shown in FIG. 3.

<Method of Driving Pixel Element>

One of the methods of driving the pixel of the invention is disclosed below, but the invention is not limited thereto. Any one who is skilled in the art related to the invention can make necessary adjustments and slight changes to fit actual needs.

Figure 4:
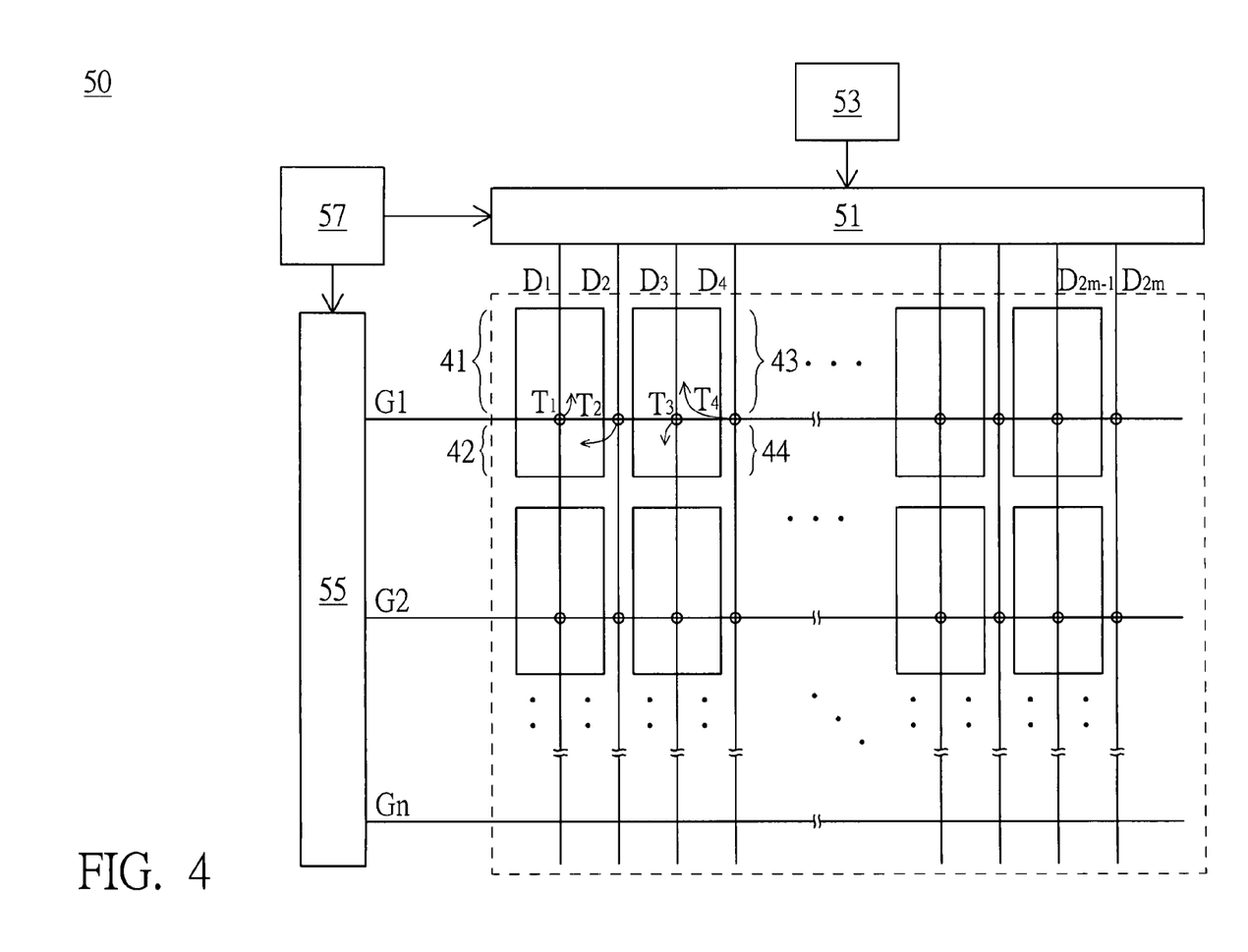
FIG. 4 is a design diagram of a liquid crystal display of the present invention.

Referring to FIG. 3 and FIG. 4. FIG. 4 is a design diagram of a pixel structure of a liquid crystal display element of the present invention. The liquid crystal display element 50 includes a plurality of gate lines $G_1, G_2, \ldots G_n$ and data lines $D_1, D_2, \ldots D_{2m}$, wherein both n and m are positive integers, and the gate lines $G_1, G_2, \ldots G_n$ are substantially criss-crossed with the data lines $D_1, D_2, \ldots D_{2m}$ in a matrix to define a plurality of pixel areas. Every pixel area is designed for one pixel element. In other words, each block in FIG. 4 denotes one pixel area, every pixel area has one pixel element of FIG. 3, and the entire display element includes a plurality of repeated pixel elements.

Besides, the data lines $D_1, D_2, D_3, D_4 \ldots D_{2m}$ are coupled to the data driver 51, and the data driver 51 is electrically connected to a voltage supplier 53. The gate lines $G_1, G_2, \ldots G_n$ are coupled to the gate driver 55. The data driver 51 and the gate driver 55 are electrically connected to a signal controller 57 respectively.

When the display element is driven, the four display domains (A1-1, A1-2, A1-3 and A1-4) of the first sub-pixel area 41 disposed in the upper part of the first pixel area 31 are controlled by the first data line $D_1$ through the first transistor T1, and the four display domains (A2-1, A2-2, A2-3 and A24) of the second sub-pixel area 42 disposed in the lower part of the first pixel area 31 are controlled by the second data line $D_2$ through the second transistor T2. The four display domains (A3-1, A3-2, A3-3 and A34) of the third sub-pixel area 43 disposed in the upper part of the second pixel area 32 are controlled by the fourth data line $D_4$ through the fourth transistor T4, and the four display domains (A4-1, A4-2, A4-3 and A4-4) of the fourth sub-pixel area 44 disposed in the lower part of the second pixel area 32 are controlled by the third data line $D_3$ through the third transistor T3.

When the display element is driven, the first sub-pixel electrode (disposed in the first sub-pixel area 41) and the second sub-pixel electrode (disposed in the second sub-pixel area 42) in the first pixel area 31 of a pixel element of FIG. 3 are respectively driven by a first voltage provided by the first data line $D_1$ and a second voltage provided by the second data line $D_2$.

The first sub-pixel electrode and the second sub-pixel electrode are respectively driven by a first voltage and a second voltage, wherein the polarity of the first voltage (indicated such as "−" polarity) is opposite to the polarity (indicated such as "+" polarity) of the second voltage. Therefore, the negative polarity ("−" polarity) of the four display domains in the first sub-pixel area 41 is opposite to the positive polarity ("+" polarity) of the four display domains in the second sub-pixel area 42 when the display element is driven to achieve dot conversion. In practical application, the second voltage could be larger than the first voltage.

The third sub-pixel electrode (disposed in the third sub-pixel area 43) and the fourth sub-pixel electrode (disposed in the fourth sub-pixel area 44) in the second pixel area 32 are respectively driven by a fourth voltage provided by the fourth data line $D_4$ and a third voltage driven by the third data line $D_3$. In practical application, the third voltage could be larger than the fourth voltage.

The third sub-pixel electrode and the fourth sub-pixel electrode are respectively driven by a third voltage and a fourth voltage, wherein the polarity (such as "−" polarity) of the third voltage is opposite to the polarity (such as "+" polarity) of the fourth voltage. Therefore, the positive polarity (such as +polarity) of the four display domains in the third sub-pixel area 43 is opposite to the negative polarity (such as − polarity) in the four display domains in the fourth sub-pixel area 44 when the display element is driven.

According to the disclosure in the second embodiment of the invention, the data lines $D_1, D_3, \ldots D_{2m-1}$ are disposed at the center of the transmitting area of the pixel, so the overall transmittance of the pixel and the symmetry of the display domain will not be significantly affected. Moreover, the data lines $D_2, D_4, \ldots D_{2m}$ are disposed at the edges of two neighboring pixel transmitting areas, so the overall transmittance of the neighboring pixel and the symmetry of the display domain will not be significantly affected.

In practical application, when the panel is displaying uniformed signals, the first data line $D_1$ and the second data line $D_2$ are preferably covered by the pixel electrode that can carry signals of opposite polarities but with the same amplitude, (likewise, the third data line $D_3$ and the fourth data line $D_4$ carry signals of opposite polarities but with the same amplitude), so the capacitance coupling between the first data line $D_1$ and the second data line $D_2$ and the pixel electrode will be offset and balanced, hence avoiding vertical crosstalk. Moreover, in the design of the pixel, there is still a sufficient distance between the first data line $D_1$ and the second data line $D_2$ and between the third data line $D_3$ and the fourth data line $D_4$, hence avoiding neighboring data lines being short-circuited without affecting the yield rate of the display element.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display element disposed in a pixel area including a first sub-pixel area, a second sub-pixel area, a third sub-pixel area and a fourth sub-pixel area arranged in an array, comprising:

a first pixel element, comprising:
  a first sub-pixel electrode and a second sub-pixel electrode disposed in the first sub-pixel area and the second sub-pixel area respectively, wherein the first sub-pixel electrode is adjacent to the second sub-pixel electrode and each of the first sub-pixel electrode and the second sub-pixel electrode comprises at least two display domains at the left and the right; and
  a first transistor and a second transistor, wherein the first sub-pixel electrode and the second sub-pixel electrode are respectively connected to the first transistor and the second transistor;

a second pixel element, comprising:
  a third sub-pixel electrode and a fourth sub-pixel electrode disposed in the third sub-pixel area and the fourth sub-pixel area respectively, wherein the third sub-pixel electrode is adjacent to the fourth sub-pixel electrode and the third sub-pixel electrode and the fourth sub-pixel electrode respectively at least comprises two display domains at the left and the right; and
  a third transistor and a fourth transistor, wherein the fourth sub-pixel electrode and the third sub-pixel electrode are respectively connected to the third transistor and the fourth transistor;

a first pair of data lines, including a first data line and a second data line, wherein the first data line is disposed at an interface between the at least two display domains of the first sub-pixel electrode and at an interface between the at least two display domains of the second sub-pixel electrode, and the second data line is disposed at edges of the first pixel element;

a second pair of data lines, including a third data line and a fourth data line, wherein the third data line is disposed at an interface between the at least two display domains of the third sub-pixel electrode and at an interface between the at least two display domains of the fourth sub-pixel electrode, and the fourth data line is disposed at edges of the second pixel element; and a gate line disposed between the first sub-pixel electrode and the second sub-pixel electrode, and disposed between the third sub-pixel electrode and the fourth sub-pixel electrode, wherein the first sub-pixel electrode, the second sub-pixel electrode, the third sub-pixel electrode and the fourth sub-pixel electrode are respectively controlled by the first data line, the second data line, the fourth data line and the third data line through the first transistor, the second transistor, the fourth transistor and the third transistor;

wherein the first sub-pixel electrode and the second sub-pixel electrode in the first pixel element are respectively driven by a first voltage provided by the first data line and a second voltage provided by the second data line, and the third sub-pixel electrode and the fourth sub-pixel electrode in the second pixel element are respectively driven by a fourth voltage provided by the fourth data line and a third voltage provided by the third data line, wherein the first voltage and the second voltage have opposite polarities, and the third voltage and the fourth voltage have opposite polarities, wherein the first sub-pixel electrode and the second sub-pixel electrode are inputted voltages of opposite polarities, and the third sub-pixel electrode and the fourth sub-pixel electrode are inputted voltages of opposite polarities; and wherein each of the first sub-pixel electrode, the second sub-pixel electrode, the third sub-pixel electrode and the fourth sub-pixel electrode is coupled with two data lines having opposite polarities.

2. The display element according to claim 1, wherein each two display domains of the first, the second, the third and the fourth sub-pixel electrodes correspondingly control tilting directions of liquid crystal molecules which form a contained angle of about 45 degrees with the first data line.

3. The display element according to claim 1, wherein the second voltage is larger than the first voltage.

4. The display element according to claim 1, wherein the third voltage is larger than the fourth voltage.

5. The display element according to claim 1, wherein the first and the second sub-pixel electrodes both in the first pixel area and the third and the fourth sub-pixel electrodes both in the second pixel area respectively comprise four display domains.

6. The display element according to claim 5, wherein the first sub-pixel electrode in the first pixel element comprises:
  a first display domain and a third display domain both disposed at the left of the first data line; and
  a second display domain and a fourth display domain both disposed at the right of the first data line, wherein the first data line is disposed at the interface between the first display domain and the second display domain and also disposed at the interface between the third display domain and the fourth display domain, and the first, the second, the third and the fourth display domains of the first sub-pixel electrode are controlled by the first data line through the first transistor.

7. The display element according to claim 5, wherein the second sub-pixel electrode in the first pixel element comprises:
  a first display domain and a third display domain both disposed at the left of the first data line, and a second display domain and a fourth display domain both disposed at the right of the first data line, wherein the first data line is disposed at the interface between the first display domain and the second display domain and also disposed at the interface between the third display domain and the fourth display domain.

8. The display element according to claim 5, wherein the third sub-pixel electrode in the second pixel element comprises:
  a first display domain and a third display domain both disposed at the left of the third data line, and a second display domain and a fourth display domain both disposed at the right of the third data line, wherein the third data line is disposed at the interface between the first display domain and the second display domain and also disposed at the interface between the third display domain and the fourth display domain, and the first, the second, the third and the fourth display domains of the third sub-pixel electrode are controlled by the fourth data line through the fourth transistor.

9. The display element according to claim 5, wherein the fourth sub-pixel electrode in the second pixel element comprises:
a first display domain and a third display domain both disposed at the left of the third data line, and a second display domain and a fourth display domain both disposed at the right of the third data line, wherein the third data line is disposed at the interface between the first display domain and the second display domain and also disposed at the interface between the third display domain and the fourth display domain, and the first, the second, the third and the fourth display domains of the fourth sub-pixel electrode are controlled by the third data line through the third transistor.

10. The display element according to claim 5, wherein the display domains of the first sub-pixel electrode and the second sub-pixel electrode correspondingly control tilting directions of liquid crystal molecules which all form a contained angle of 45 degrees with the first data line, and the display domains of the third sub-pixel electrode and the fourth sub-pixel electrode correspondingly control the tilting directions of the liquid crystal molecules which all form a contained angle of 45 degrees with the third data line.

11. The display element according to claim 5, wherein the four display domains of the first sub-pixel electrode and the second sub-pixel electrode are inputted voltages of opposite polarities as well as the four domains of the third sub-pixel electrode and the fourth sub-pixel electrode are inputted voltages of opposite polarities, and the four display domains of the first sub-pixel electrode and the fourth sub-pixel electrode are inputted voltages of the same polarity.

12. The display element according to claim 5, wherein the four display domains of the first sub-pixel electrode and the second sub-pixel electrode in the first pixel area are respectively driven by the first voltage and the second voltage larger than the first voltage, and the four display domains of the third sub-pixel electrode and the fourth sub-pixel electrode in the second pixel area are respectively driven by the fourth voltage provided by the fourth data line and the third voltage provided by the third data line, and the third voltage is larger than the fourth voltage.

13. The display element according to claim 1, wherein the first pair of data lines has two data lines, and the second pair of data lines has two data lines.

14. The display element according to claim 1, wherein each of the first sub-pixel electrode, the second sub-pixel electrode, the third sub-pixel electrode and the fourth sub-pixel electrode is substantially overlapped with two data lines.

* * * * *